Feb. 9, 1943.   H. W. RUPPEL   2,310,259
STOCK FEED FOR AUTOMATIC SCREW MACHINES
Filed May 11, 1940   3 Sheets-Sheet 1
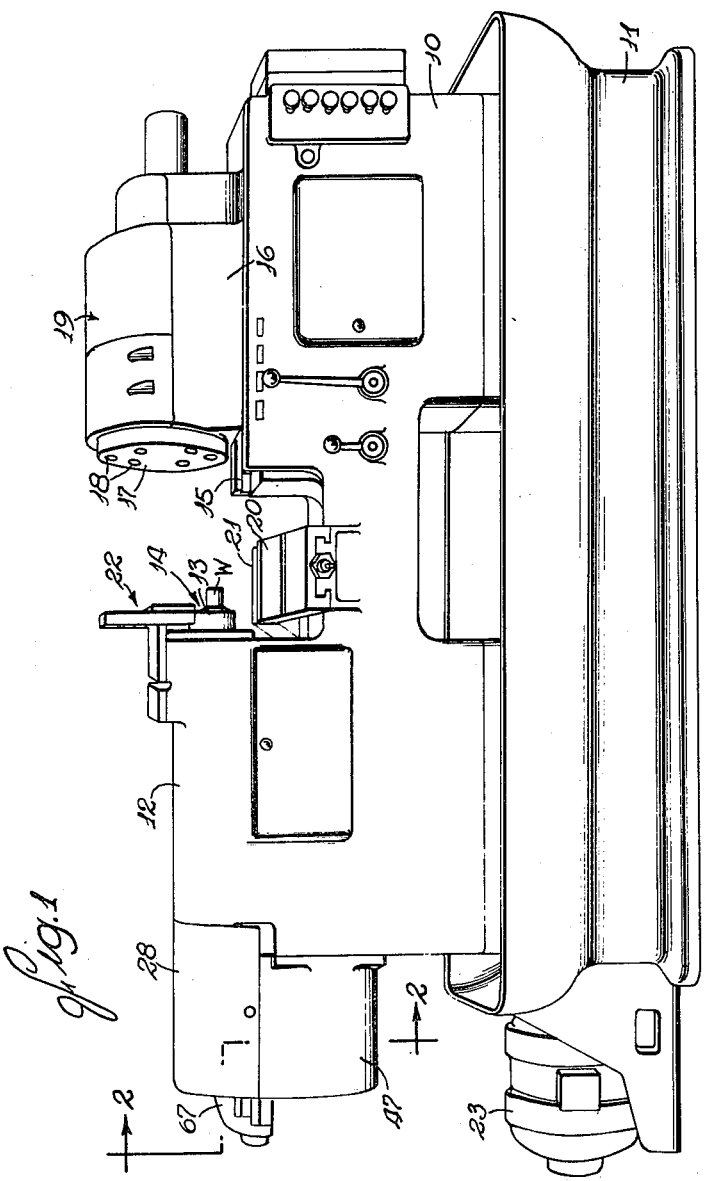
INVENTOR.
Harry W. Ruppel
BY
Parker, Carlson, Pitner & Hubbard
ATTORNEYS

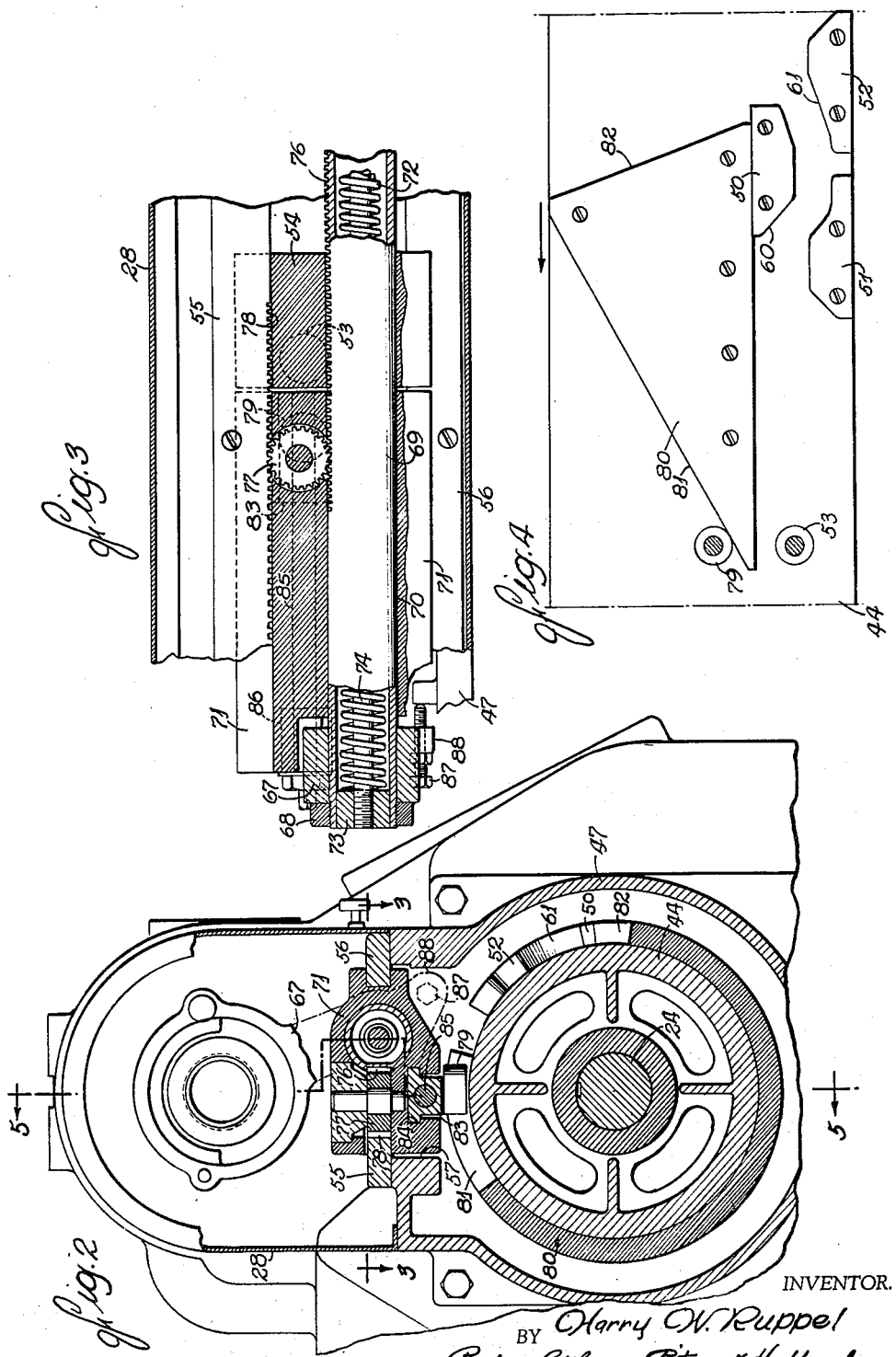

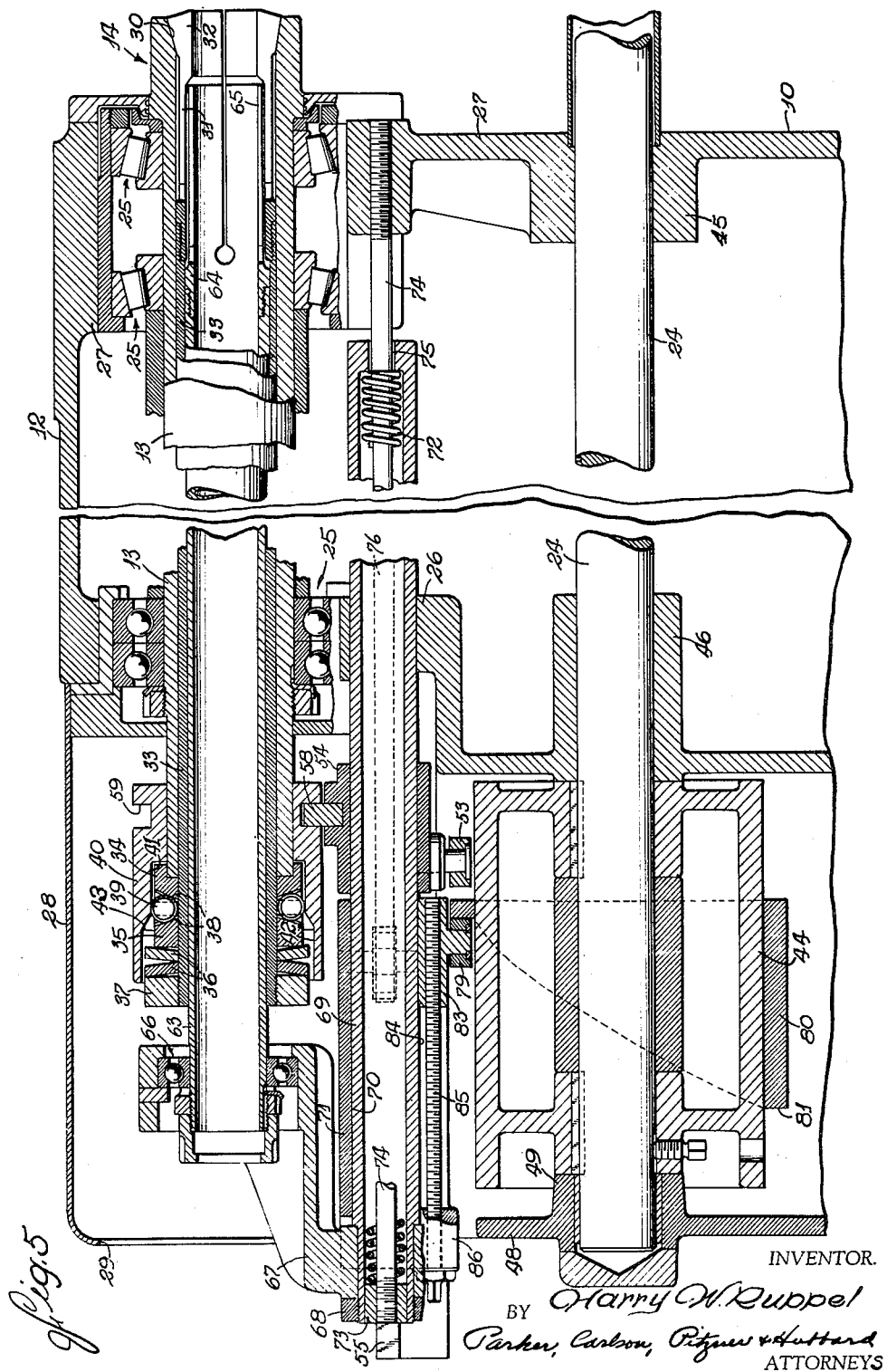

Patented Feb. 9, 1943

2,310,259

UNITED STATES PATENT OFFICE 2,310,259

STOCK FEED FOR AUTOMATIC SCREW MACHINES

Harry W. Ruppel, Cleveland, Ohio, assignor to The Foote-Burt Company, Cleveland, Ohio, a corporation of Ohio Application May 11, 1940, Serial No. 334,626

13 Claims. (Cl. 29—62)

The present invention relates to means for feeding bar stock in an automatic screw machine.

One of the objects of the present invention is to provide a novel stock feeding mechanism which is readily and conveniently adjustable to vary the length of stock feed.

Another object is to provide a new and improved stock feed mechanism operable by a cam to impart a stock feed in excess of the throw of the cam.

Other objects and advantages will become apparent as the description proceeds.

In the accompanying drawings Figure 1 is a front perspective view of a machine having a stock feed mechanism embodying the features of my invention.

Fig. 2 is a transverse vertical sectional view taken substantially along line 2—2 of Fig. 1.

Fig. 3 is a fragmentary horizontal sectional view taken substantially along line 3—3 of Fig. 2.

Fig. 4 is a plan development of a cam drum for operating the stock feed mechanism.

Fig. 5 is a fragmentary sectional view on an enlarged scale taken substantially along line 5—5 of Fig. 2.

Referring more particularly to the drawings, the stock feed mechanism constituting the exemplary embodiment of the invention is disclosed as forming part of an automatic screw machine. This machine (see Fig. 1) comprises a hollow elongated horizontal frame 10 rigidly mounted on a floor base 11. One end of the frame is formed integral with an elevated housing 12 enclosing and rotatably supporting a hollow work spindle 13. A bar of stock W is adapted to be fed intermittently through this spindle 13 and into an automatic chuck 14. The other end of the frame 10 is formed with elevated horizontal guides 15 supporting a slide 16 for adjustment longitudinally of the spindle 13. A tool turret 17, having a plurality of annularly arranged parallel tool holes 18, is mounted in a turret housing 19 integral with the slide 16 for axial reciprocation and for rotation to bring successive tools (not shown) into operation upon the bar stock projecting axially from the chuck 14. The means for automatically reciprocating, indexing and locking the turret 17 form no part of the present invention, and are disclosed in my copending application Serial No. 334,625, filed May 11, 1940. Two cross slides 20 and 21 are mounted on the front and rear of the frame 10 between the spindle 13 and the turret 17, and are adapted to support additional tools (not shown) for operating on the stock bar. An automatically operable independent cut-off mechanism 22 is mounted on the spindle housing 12 for severing the finished work piece from the stock bar at the end of the machine operation. All of the power actuated elements of the machine hereinbefore identified, with the exception of the power transmission for driving the work spindle 13, are operable in positive timed relation, the means for this purpose deriving power from an electric motor 23 on the base 11, and including a main cam shaft 24 extending longitudinally through the frame 10.

The work spindle 13 is journaled in antifriction bearings 25 suitably mounted in end walls 26 and 27 of the housing 12. The back end of the spindle 13 projects from the housing 12, and is enclosed in a cover or guard 28 having an opening 29 in the end. The power transmission for driving the spindle 13 is not shown since per se it forms no part of the present invention, and is disclosed in my copending application, Serial No. 334,623, filed May 11, 1940. The spindle 13 is tubular in form to permit the stock to be fed therethrough, and to be clamped by the chuck 14 at the forward end for engagement by the tools.

The chuck 14 is of the draw-in collet type, and comprises a conical or taper seat 30 in the nose or forward projecting end of the spindle 13, and a tubular collet member 31 slidably guided in the spindle bore and having tapered radially yieldable jaws 32 coacting with the seat. Inward movement serves to contract the jaws 32 into clamping engagement with the periphery of the work, and outward movement serves to release the jaws. The inner end of the collet member 31 is threaded or otherwise suitably connected to a coaxial actuating sleeve 33 extending slidably through the rear end portion of the spindle 13.

To provide means for actuating the collet member 31, two annular spread collars 34 and 35 are slidably mounted in axially spaced relation on the inner projecting end of the sleeve 33. One collar 34 is in back engagement with the inner end of the spindle 13, and is stationary. The other collar 35 is in back engagement with yieldable compression spring means 36 seated against an annular stop nut 37 on the very end of the collet sleeve 33. In the present instance, the spring means 36 consists of two reverse dish-shaped spring disks. The collars 34 and 35 are formed on their adjacent sides with peripherally spaced radial notches having oppositely inclined wedge faces 38. A plurality of peripherally spaced rollers 39 are disposed in the radial spaces between the opposed wedge faces 38 to complete the axial thrust relationship. In the present instance, these rollers 39 are barrel shaped at the ends to obtain point contact with the faces 38 and prevent scoring thereof. A wedge sleeve or thimble 40 is axially slidable on the inner end of the spindle 13 and encircles the collars 34 and 35 and the rollers 39 to maintain them in operative assembly, the shape of the rollers conforming to the curvature of the thimble. The interior of the sleeve 40 is formed with step bores 41 and 42 of relatively small and large diameters and connected by a conical wedge face 43 adapted to ride over the rollers 39. Upon movement of the sleeve 40 to the right, the large bore 42 will be shifted into position to receive and hence relieve the pressure on the rollers 39, thereby permitting the chuck 14 to open. Upon reverse movement of the sleeve 40, the wedge face 43 will force the rollers 39 inwardly between the wedge faces 38 of the collars 34 and 35 until the rollers enter the small bore 41. As a result, the collars 34 and 35 are spread to exert a heavy closing thrust on the chuck 14. Overtravel of the movable collar 35 after the chuck 14 is closed is permitted by the reverse springs 36, and hence variations in stock are accommodated.

The chuck 14 is adapted to be actuated automatically in correlated timed relation to other elements of the machine. This is accomplished by operating the wedge sleeve 40 from a rotary cam drum 44 fixed on the main cam shaft 24 of the machine. The cam shaft 24 extends through spaced bearings 45 and 46 in the machine frame 10 into a tubular extension 47 of the latter. An end plate 48 is removably connected to close the frame extension 47, and is formed with an end bearing 49 for the shaft 24. The cam drum 44 is keyed to the shaft 24 for rotation therewith in a fixed axial position between the bearings 46 and 49. Suitably secured as by means of bolts to the periphery of the cam drum 44 are a series of cams 50, 51 and 52 adapted to engage and reciprocate a cam roller 53 longitudinally of the rotary axis once over a predetermined portion of each drum revolution. The roller 53 is supported in the path of the cams 50, 51 and 52 on the underside of a chuck slide 54 which is slidably adjustable on spaced guides 55 and 56 extending longitudinally of the spindle 13 at opposite sides of an opening 57 in the top of the frame extension 47. A shoe 58 carried by the chuck slide 54 engages in a peripheral groove 59 in the sleeve 40. The cam 50 is the unchucking cam, and has an inclined leading face 60 for engaging and shifting the roller 53 in a direction to release the chuck 14. Centrifugal force and the pressure of the springs 36 tend to throw the rollers 39 outwardly as soon as the latter leave the bore 41 of the sleeve 40. The cam 51 is a safety cam or bumper which serves to confine the roller 53 against the cam 50 in the unchucking operation, and hence to prevent a snap action when the rollers 39 are unblocked. The cam 52 is the chucking cam, and has an inclined leading face 61 for forcing the roller 53 to the left in the continued rotation of the drum 44 to again engage the chuck 14 after a short interval of time during which the stock has been advanced in a predetermined feed movement.

The bar stock is adapted to be fed through the spindle 13 to the chuck 14 automatically in adjustable feed increments between successive cutting operations. The stock feed mechanism comprises a tube 63 extending slidably into and substantially through the collet sleeve 33. Rigidly connected, as by screw threads, to the forward end of the tube 63 is a tubular clamping member 64 split longitudinally to provide a plurality of peripherally spaced yieldable fingers 65 adapted to engage the periphery of the work stock with a friction grip. The rearwardly projecting end of the tube 63 is rotatably connected through an antifriction bearing 66 to the upper end of a bracket 67. The lower end of the bracket 67 is rigidly secured by a nut 68 to the outer end of a long spring tube 69 extending slidably through a bore 70 longitudinally of the tube 69 in a feed cam slide 71 reciprocably mounted on the guides 55 and 56. A coiled compression spring 72 normally tends to urge the tube 69 in a direction to advance the tube 63 in a feeding movement. The spring 72 is confined within the tube 69 and abuts against the inner end thereof. The other end of the spring 72 abuts against a collar 73 slidable in the tube 69 and threaded onto the outer end of a rod 74. This rod extends centrally through the spring 72 and through an opening 75 in the inner end of the tube 69 into fixed threaded engagement with the wall 27 of the frame 10. It will be evident that the spring 72 tends to urge the spring tube 69 inwardly and thereby to advance the feed tube 63 into the spindle 13.

The spring tube 69 is adapted to be moved outwardly by the cam drum 44 preparatory to a feed movement effected by the spring 72. Hence, one side of the tube 69 is formed with a longitudinal gear rack 76 which meshes with an idler gear 77 suitably journaled within the slide 71. The gear 77 in turn meshes with a stationary longitudinal gear rack 78 formed in the face of the guide 55. As a result, movement of the slide 71 through any distance will cause movement of the feed tube 63 through double said distance.

The slide 71 carries a depending roller 79 which is disposed for engagement by a cam 80 on the rotary cam drum 44 to effect a feeding reciprocation once for each drum revolution. Referring to Fig. 4, the cam 80 is triangular in shape, comprising a long inclined face 81 and an abrupt drop 82. The cam face 81 acts to move the roller 79 to the left so as to retract the stock tube 63 and with it the friction clamp or grip 65 into a new gripping position while the work is held in fixed axial position by the chuck 14. In this movement, the spring 72 is placed under compression. The cam 80 is so related in angular phase to the unchucking cam 50 that the face 81 will fully retract the stock tube 63 just before the chuck 14 is released. The moment the chuck is sufficiently released or opened to permit the stock to slide, the cam drop 82 will release the roller 79 and permit the spring 72 to advance the tube 69 and hence the stock slide 71 into initial position. Consequently, the work stock which has been regrasped in a new position by the feed grip 65 will be advanced in a predetermined feed movement through the spindle 13 for the next series of cutting operations. More than one feeding operation during each full cycle of the machine may be obtained by mounting additional cams, corresponding to the cams 50, 51, 52 and 80, on the drum 44.

The extent or length of feed is determined by the range of movement of the roller 79 through engagement with the cam face 81. This in turn is dependent on the initial position of the cam roller 79 in relation to the cam 80 at the point of engagement. It will be evident that the range of movement of the roller 79 will be progressively reduced as the initial position is advanced along the cam face 81 toward the cam apex. One of the important features of the present invention therefore is to provide for convenient adjustment of the initial position of the roller 79. This is accomplished by mounting the roller 79 on a secondary slide 83 supported for adjustment in a longitudinal guideway 84 in the underside of the feed slide 71. The secondary slide 83 is in threaded engagement with the inner end of an adjusting screw 85 extending longitudinally of the guideway 84. The outer end of the screw 85 is rotatably anchored in a lug 86 on the feed slide 71 and is squared for the reception of a hand wrench (not shown) and readily accessible from the exterior of the machine. Inward movement of the feed slide 71 in response to the spring 72 is limited by a stop screw 87 adjustably threaded through a bracket 88 for engagement with the frame extension 47. It will be evident that the range of stock feed from maximum to zero may be quickly and conveniently adjusted merely by rotating the screw 85 to vary the position of the roller 79 in relation to the stop screw 87 and hence in relation to the initial point of engagement with the cam face 81.

I claim as my invention:

1. A stock feed mechanism for automatic screw machines comprising, in combination, a hollow spindle, a stock feed tube reciprocable longitudinally in said spindle and adapted to receive a bar of stock and in each forward movement to advance said stock a predetermined extent through said spindle, spring means tending to move said tube in a forward direction, positive stop means for limiting the forward movement of said tube, a cam follower movable with said tube, a cam operable in each cycle to shift said follower against the action of said spring means in a return movement and then to release said follower so as to permit forward movement of said tube, and means for adjusting said follower longitudinally of said tube to vary the position of said follower relative to the throw of said cam, whereby to control the extent of movement of said tube.

2. A stock feed mechanism for automatic screw machines comprising, in combination, a housing, a hollow spindle journaled in said housing, a stock feed tube reciprocable longitudinally in said spindle and adapted to receive a bar of stock and in each forward movement to advance said stock a predetermined extent in said spindle, compression spring means within said housing tending to move said tube yieldably in a forward direction, stop means for limiting the forward movement of said tube, a slidable cam follower geared to said tube for synchronous movement with said tube, a cam adapted to engage said follower to retract said tube against the action of said spring means in a return movement and to release said follower to permit forward movement of said tube, and means independent of said stop means for rectilinearly adjusting said follower to vary the position of said follower relative to the throw of said cam whereby to control the extent of feeding movement of said tube.

3. A stock feed mechanism for automatic screw machines comprising, in combination, a hollow spindle, a stock feed member reciprocable in a forward feeding movement and a return movement to advance a bar of stock periodically a preselected extent through said spindle, means for adjustably limiting the extent of movement of said member in one direction to define a normal stop position, a cam follower movable synchronously with said member, a cam for engaging said follower to shift said member in a reverse direction, and means independent of said first mentioned means for adjusting the extent of engagement of said follower by said cam to control the range of movement of said member out of said stop position.

4. A stock feed mechanism for automatic screw machines comprising, in combination, a housing, a hollow spindle journaled in said housing, a stock feed member reciprocable in a forward feeding movement and a return movement to advance a bar of stock periodically a preselected extent through said spindle, means for limiting the forward movement of said member to a normal stop position, a rotary cam having an end cam face inclined to the axis of rotation, a cam follower slidably mounted in said housing and connected to said member for synchronous movement therewith and disposed in the path of said cam face, and means for slidably adjusting the position of said follower relation to said member longitudinally of said axis, whereby to adjust the initial position of said follower in said stop position of said member relation to the throw of said cam face and thereby to control the extent of movement of said member out of said stop position.

5. A stock feed mechanism for automatic screw machines comprising, in combination, a hollow spindle, a stock feed tube reciprocable longitudinally in said spindle and adapted to receive a bar of stock and in each forward movement to advance said stock a predetermined extent through said spindle, spring means tending to move said tube in one direction, stop means for limiting the movement of said tube by said spring means, a feed slide connected for synchronous movement with said tube, an auxiliary slide mounted on said feed slide for adjustment longitudinally of said tube, an adjusting screw for adjusting said auxiliary slide, a cam follower on said auxiliary slide, and a cam movable transversely of said tube and having an inclined cam face for engaging said follower to effect movement of said tube in a reverse direction in opposition to said spring means, adjustment of said auxiliary slide serving to vary the extent of cam throw imparted to said follower.

6. In a machine tool, in combination, a frame, a tubular spindle journaled in said frame, a stock feed tube extending slidably into said spindle, an actuating member mounted for reciprocation in said frame parallel to said tube, a stationary gear rack extending longitudinally of said tube, a gear rack in parallel opposed relation to said first mentioned gear rack and movable with said tube, a pinion journaled on said member and meshing at opposite sides with said gear racks, whereby movement of said member will cause a multiplied movement of said tube, and means for reciprocating said member.

7. In a machine tool, in combination, a frame, a tubular spindle journaled in said frame, a stock feed tube extending slidably into said spindle, a spring tube extending slidably through said frame in parallel relation to said feed tube, a bracket connecting said tubes for joint reciprocation while permitting said stock feed tube to rotate with said spindle, a coiled compression spring disposed in said spring tube, a bar extending through said spring and said spring tube and anchored to said frame, a collar secured to the free end of said bar and slidable in the outer end of said spring tube to confine said spring under compression, said spring tending to urge said feed tube forwardly, adjustable stop means for limiting the forward movement of said feed tube, a feed slide mounted for reciprocation in said frame parallel to said feed tube, a stationary gear rack formed in said frame and extending longitudinally of said spring tube, a gear rack in parallel opposed relation to said first mentioned gear rack and rigid with said spring tube, a pinion journaled on said feed slide and meshing at opposite sides with said gear racks, whereby movement of said feed slide through any distance will cause said spring tube to be moved double said distance, and means for reciprocating said feed slide.

8. In a machine tool, in combination, a frame, a tubular spindle journaled in said frame, a stock feed tube extending slidably into said spindle, a parallel spring tube connected to said feed tube for longitudinal movement therewith, a spring in said spring tube and tending to urge said tubes in a forward direction, a feed slide mounted for reciprocation in said frame parallel to said tubes, a stationary gear rack extending longitudinally of said tubes, a gear rack in parallel opposed relation to said first mentioned gear rack and movable with said tubes, a pinion journaled on said slide and meshing at opposite sides with said gear racks, whereby movement of said slide will cause a multiplied movement of said tubes, and cam means for periodically shifting said slide through a predetermined distance in opposition to said spring.

9. In a machine tool, in combination, a frame, a tubular spindle journaled in said frame, a stock feed tube extending slidably into said spindle, a feed slide mounted for reciprocation in said frame parallel to said tube, a stationary gear rack extending longitudinally of said tube, a gear rack in parallel opposed relation to said first mentioned gear rack and movable with said tube, a pinion journaled on said slide and meshing at opposite sides with said gear racks, whereby movement of said slide will cause a multiplied movement of said tube, spring means tending to move said slide in one direction, a cam follower mounted on said slide and adjustable thereon longitudinally of said tube, and a cam movable transversely of said tube and having an inclined cam face with a predetermined throw for engaging said follower to shift said slide in opposition to said spring means.

10. In a machine tool, in combination, a frame, a tubular spindle journaled in said frame and having a chuck at its forward end, a stock feed tube extending slidably into said spindle and having a friction stock clamp, a feed slide mounted for reciprocation in said frame parallel to said tube, a stationary gear rack extending longitudinally of said tube, a gear rack in parallel opposed relation to said first mentioned gear rack and movable with said tube, a pinion journaled on said slide and meshing at opposite sides with said gear racks, whereby movement of said slide will cause a multiplied movement of said tube, spring means tending to move said tube in one direction into a predetermined stop position a cam follower on said slide and adjustable thereon longitudinally of said tube, a rotary cam drum on an axis parallel to said spindle, a cam on said drum and having an inclined cam face for engaging said follower to shift said tube a predetermined distance out of said stop position in opposition to said spring means, and means including cam means on said drum for opening said chuck during the forward movement of said tube.

11. In a machine tool, in combination, a frame, a tubular spindle journaled in said frame and having a chuck at one end, a stock feed tube extending slidably into said spindle and having a stock clamp at its forward end, a spring tube extending in parallel relation to said feed tube, a bracket connecting said tubes for joint reciprocation, a coiled compression spring disposed in said spring tube and tending to urge said tubes forwardly, adjustable stop means for limiting the forward movement of said tubes, a feed slide mounted for reciprocation in said frame parallel to said feed tube, a stationary gear rack formed in said frame and extending longitudinally of said spring tube, a gear rack in parallel opposed relation to said first mentioned gear rack and rigid with said spring tube, a pinion journaled on said feed slide and meshing at opposite sides with said gear racks, a secondary slide mounted on said feed slide for adjustment longitudinally of said feed tube, an adjusting screw for shifting said secondary slide on said feed slide, a cam roller on said secondary slide, a cam shaft journaled in said frame parallel to said feed tube, a cam drum fixed on said cam shaft, and a triangular stock feed cam on the periphery of said cam drum for periodically engaging said roller to move the latter in a direction to withdraw said feed tube, and then releasing said roller to permit said spring to advance said feed tube.

12. In a machine tool, in combination, a frame, a tubular spindle journaled in said frame, a stock feed tube extending slidably into said spindle, an actuating member mounted for reciprocation in said frame parallel to said tube, a stationary gear member mounted on said frame, motion transmitting means interconnecting said actuating member and said tube and coacting with said gear member to impart a multiplied movement to said tube upon a predetermined movement of said actuating member, and means for reciprocating said actuating member.

13. In a machine tool, in combination, a frame, a tubular spindle journaled in said frame, a stock feed tube extending slidably into said spindle, a feed slide mounted for reciprocation in said frame parallel to said tube, means interconnecting said slide and said tube and operable to impart a synchronous but greater movement to said tube upon movement of said slide through a predetermined distance, a cam follower on said slide, and a cam movable transversely of said spindle and having an apex movable into engagement with said follower to shift said slide through a predetermined distance, said follower and said cam being relatively adjustable to vary the degree of engagement.

HARRY W. RUPPEL.